United States Patent [19]
Kasamatsu

[11] Patent Number: 5,761,338
[45] Date of Patent: Jun. 2, 1998

[54] IMAGE DETECTION AND BACKGROUND PROCESSING DEVICE AND METHOD

[75] Inventor: Toru Kasamatsu, Toyokawa, Japan

[73] Assignee: Minolta Co., Ltd., Osaka, Japan

[21] Appl. No.: 535,644

[22] Filed: Sep. 28, 1995

[30] Foreign Application Priority Data

Sep. 30, 1994 [JP] Japan ................... 6-236814

[51] Int. Cl.⁶ ........................... G06K 9/36
[52] U.S. Cl. ........................... 382/176; 358/464
[58] Field of Search ................... 382/164, 176, 382/180, 270, 286, 291, 292, 299; 358/464, 453, 538, 528, 449, 451; 399/370, 376, 389

[56] References Cited

U.S. PATENT DOCUMENTS

| | | | |
|---|---|---|---|
| 4,833,722 | 5/1989 | Morton et al. | 382/22 |
| 4,837,450 | 6/1989 | Satomura et al. | 250/571 |
| 4,899,227 | 2/1990 | Yamada | 358/452 |
| 4,975,768 | 12/1990 | Takaraga | 358/75 |
| 5,115,478 | 5/1992 | Sugiura | 382/50 |
| 5,119,211 | 6/1992 | Sakurai | 358/464 |
| 5,289,296 | 2/1994 | Yamada | 358/530 |
| 5,363,211 | 11/1994 | Hasebe et al. | 358/451 |
| 5,467,203 | 11/1995 | Kawata | 358/451 |

FOREIGN PATENT DOCUMENTS

| | | | |
|---|---|---|---|
| 56-79374 | 6/1981 | Japan | 382/164 |
| 5-48889 | 2/1993 | Japan | H04N 1/40 |
| 6-233145 | 8/1994 | Japan | H04N 1/46 |

*Primary Examiner*—Andrew W. Johns
*Attorney, Agent, or Firm*—Sidley & Austin

[57] ABSTRACT

An image detection and background processing device and method having a image reader for reading a whole document and converting the read document to a digital image data of multi value. The image forming apparatus detects the density of a background in the document based on the digital image data obtained by the image reader, sets a reference value based on the background density as well as the distribution of the digital image data, and distinguishes an image area of the document from the background by comparing the reference value and the image data so as to execute a process concerning the distinguished image area (for example, an automatic magnification selection process or an automatic paper selection process). The apparatus and method includes analysis capability for determining whether the background area can be accurately discriminated from the image area based on image data.

25 Claims, 13 Drawing Sheets

1

IMAGE DETECTION AND BACKGROUND PROCESSING DEVICE AND METHOD

BACKGROUND OF THE INVENTION

1. Field of the Invention

The present invention relates to an image forming apparatus such as a digital color copying machine.

2. Description of the Related Art

Conventionally, copying machines are provided with a frame editing function to create frames and binding margins on the copied sheet after reducing the size of the document. FIG. 1(a) shows the relationship between an image on a document and an image created on copied sheet when executing said frame editing function.

However, as shown in FIG. 1(b), when trying to enlarge or reduce only the image portion of a document such as a photograph or newspaper with a frame to a desired paper size, if the image area is unclear, only the magnification of the enlarged or reduced portions can be set based on the size of the document making it necessary to make wasteful copies in order to obtain the desired image.

In opposition to this, there is a document detection apparatus that detects the image size in response to changes in the density within the document. This apparatus detects the image size from the change points from white to black pixels of binary images. However, because a full-color copying machine that handles multiple value data determines the foundation density as the image density as well, sufficient detection of an image size is not possible by only the density change points.

SUMMARY OF THE INVENTION

The main object of this invention is to provide an image forming apparatus that can accurately detect an image size in a document.

Another object of this invention is to make it possible to accurately detect an image size with a full-color copying machine as well.

A further object of this invention is to provide an image forming apparatus that can accurately detect an image area of a document based on the density of the background portion of the document.

These and other objects of the present invention are accomplished by an image forming apparatus comprising reading means for reading a document image which includes an image area and a background and converting the read document image to a digital image data of multiple value, detecting means for detecting a density of the background in the image based on the image data obtained by said reading means, setting means for setting a reference value as a multiple value data based on the background density obtained by said detecting means and distinction means for distinguishing the image area from the background by comparing the reference value set by said setting means and the image data detected by said reading means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

2

Figure 1A:
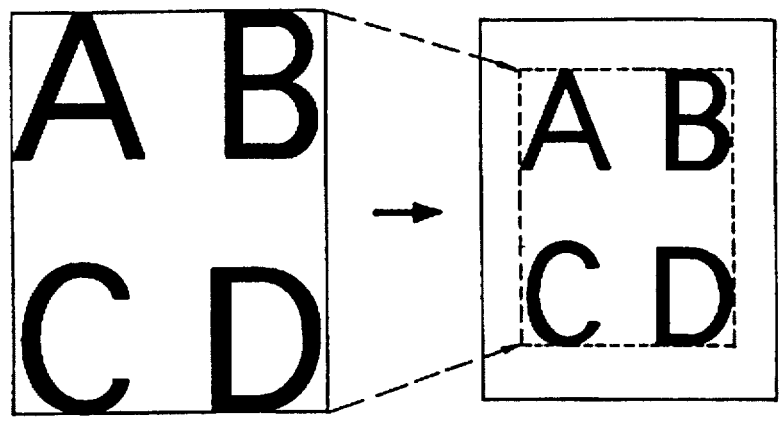
Figure 1B:
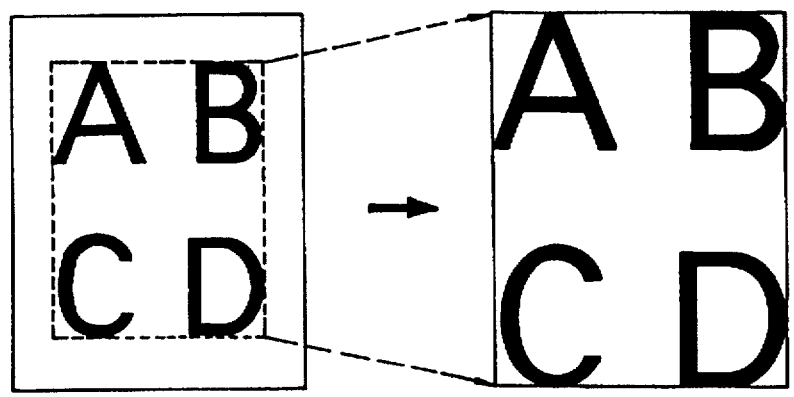
Figure 2:
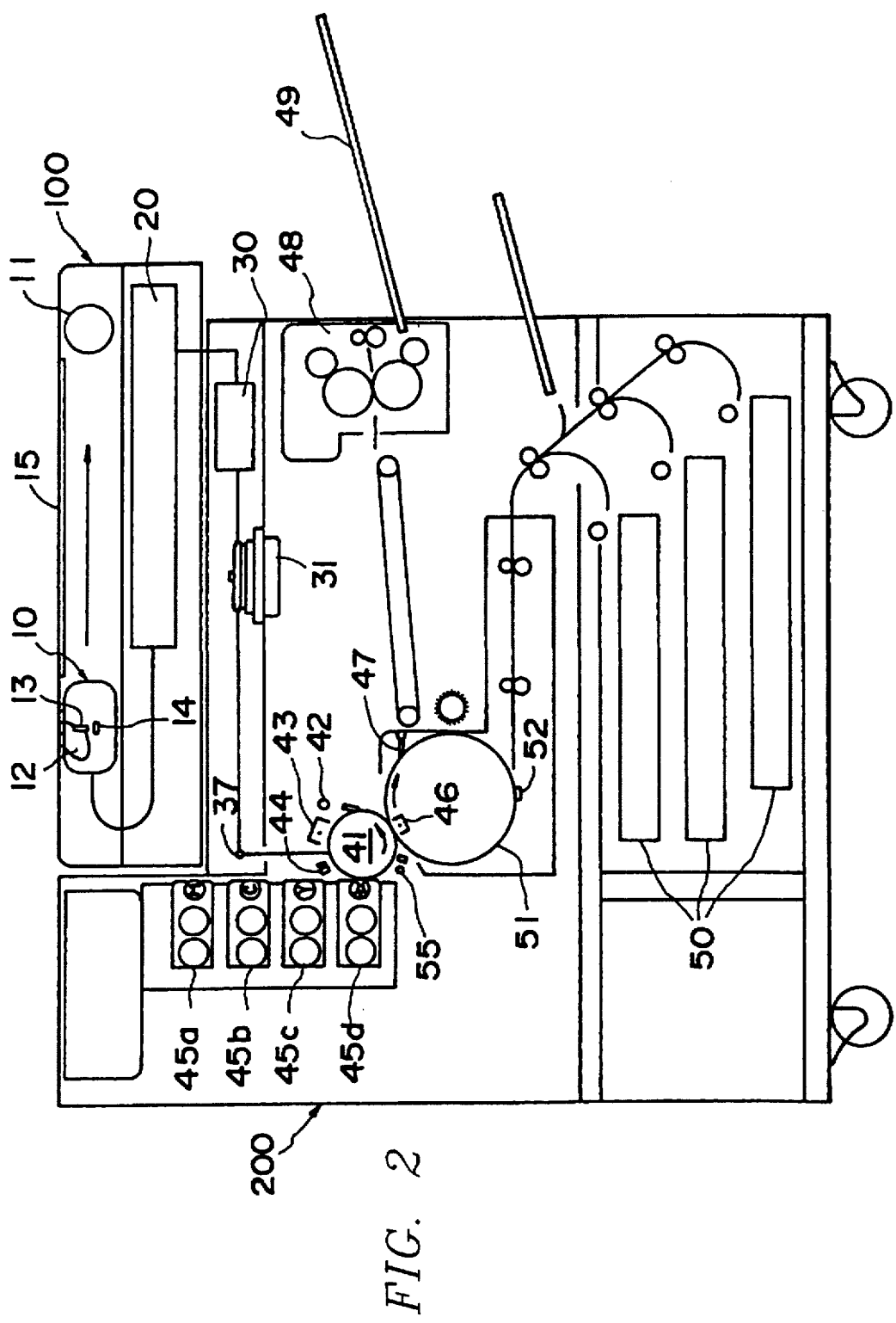
Figure 3:
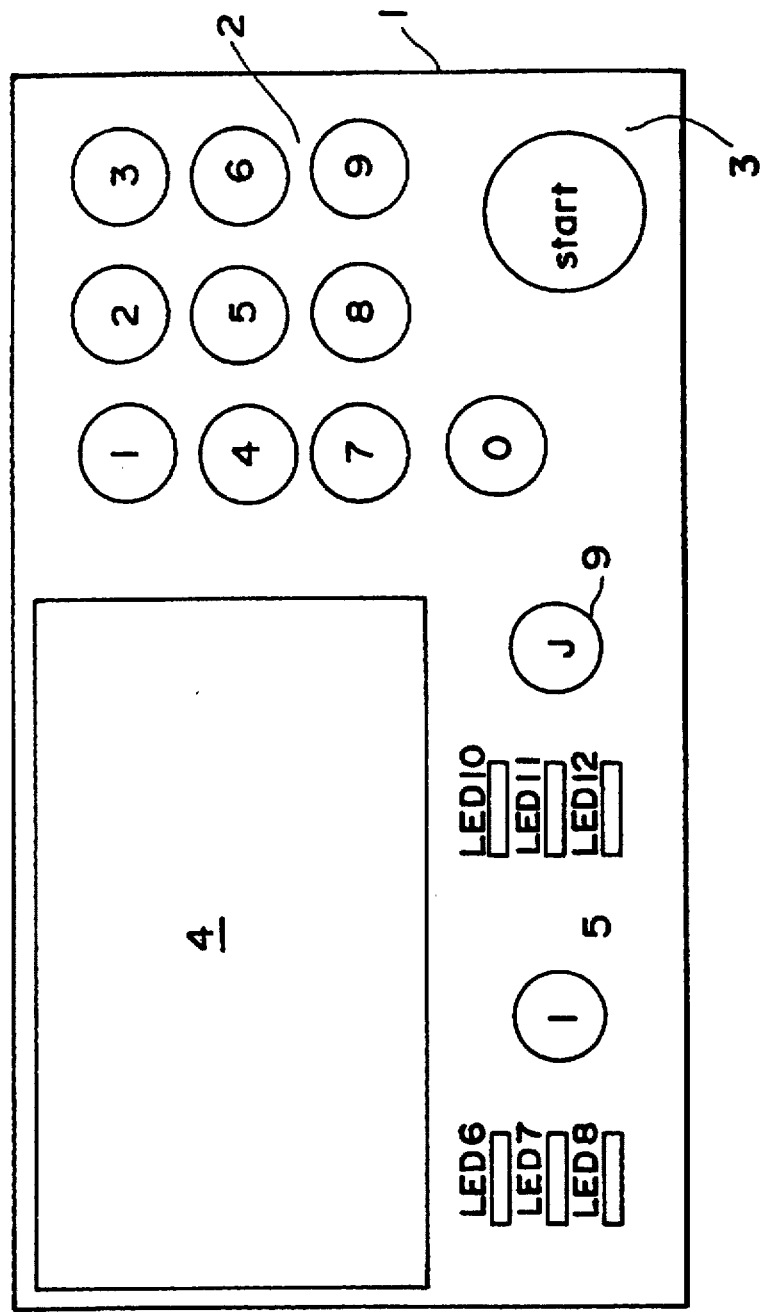
Figure 4:
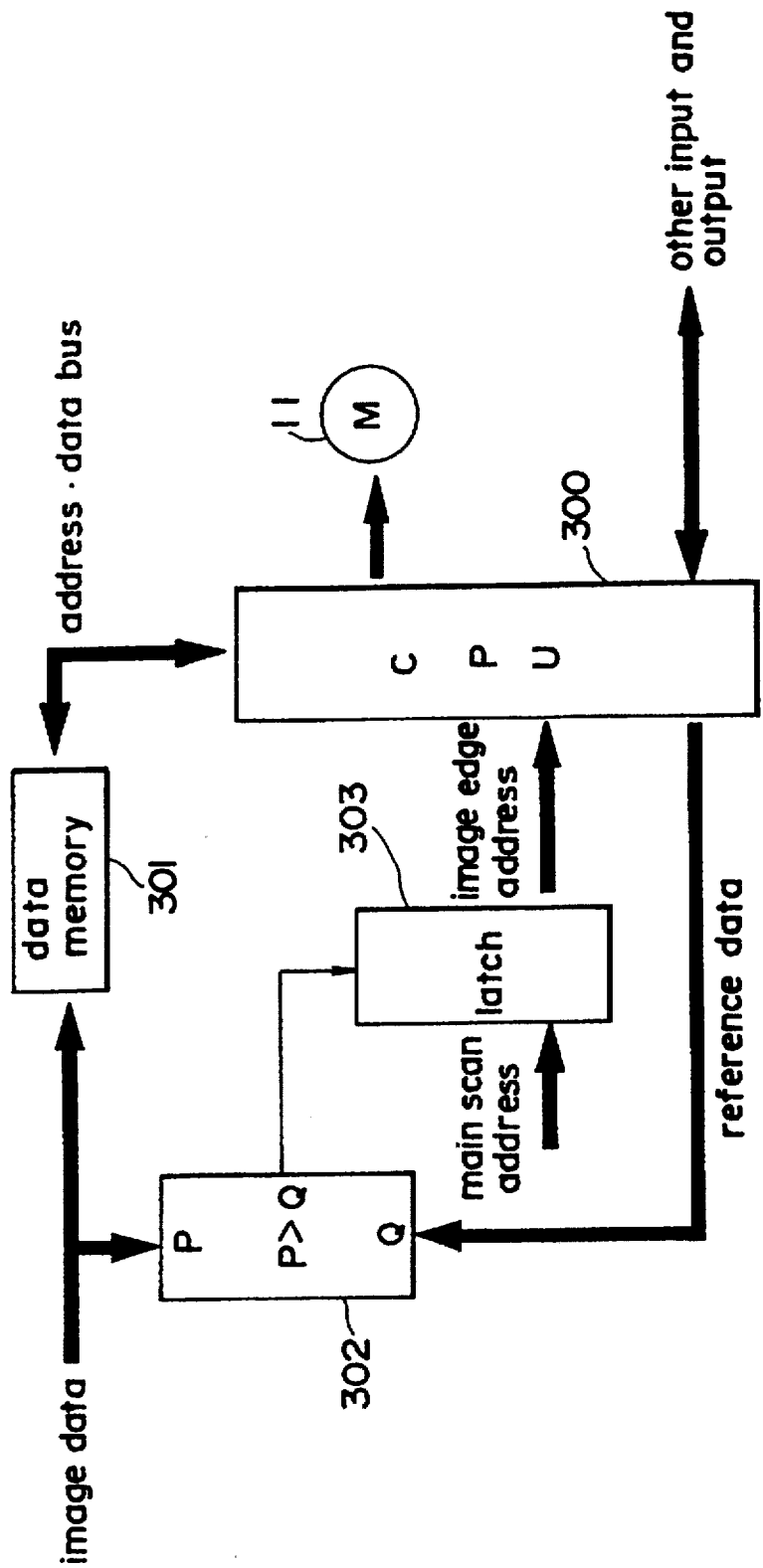
Figure 5:
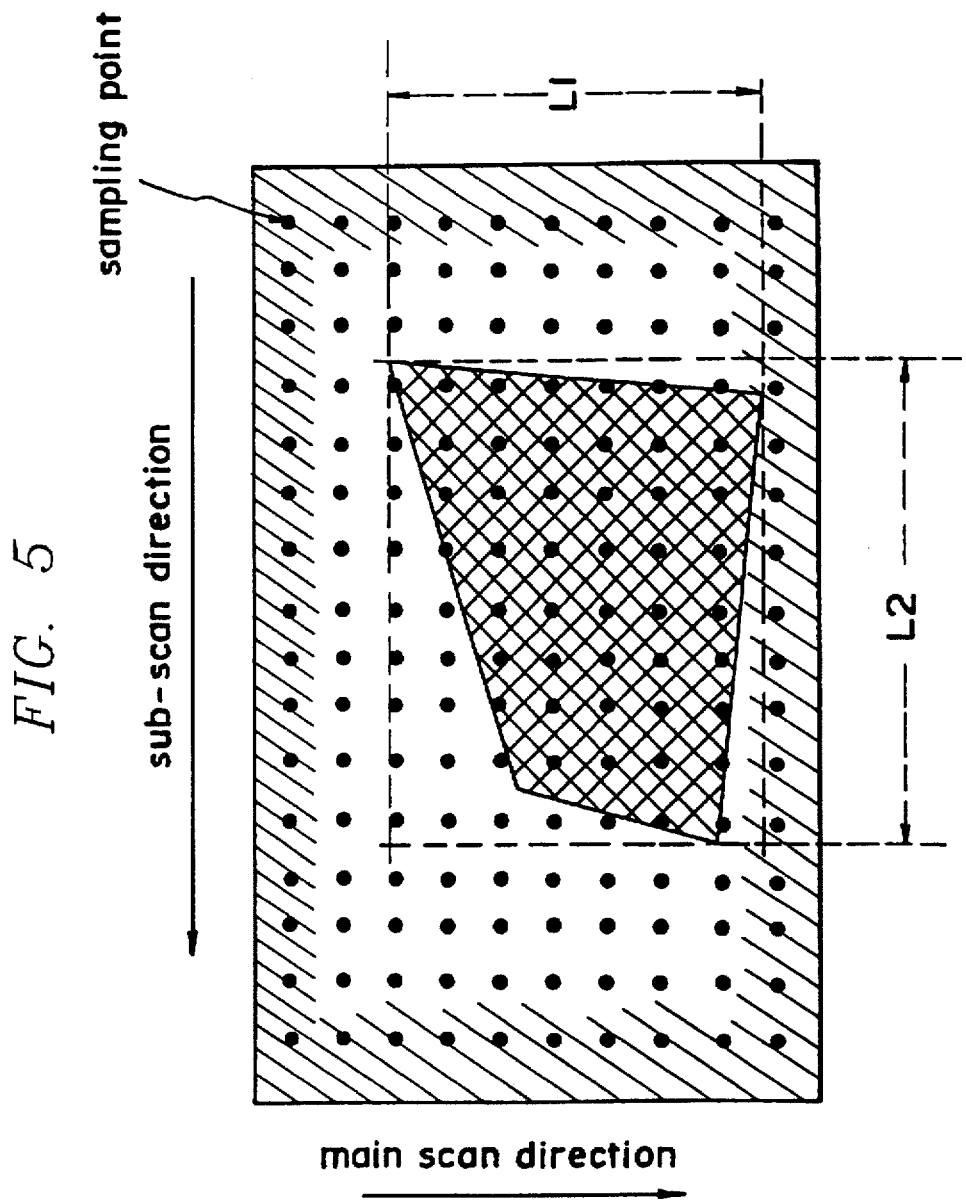
Figure 6A:
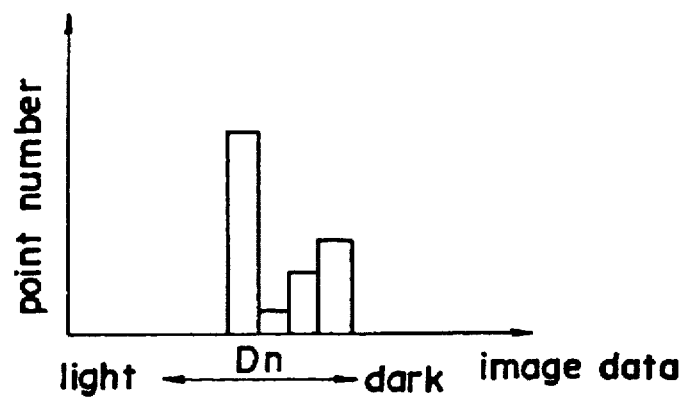
Figure 6B:
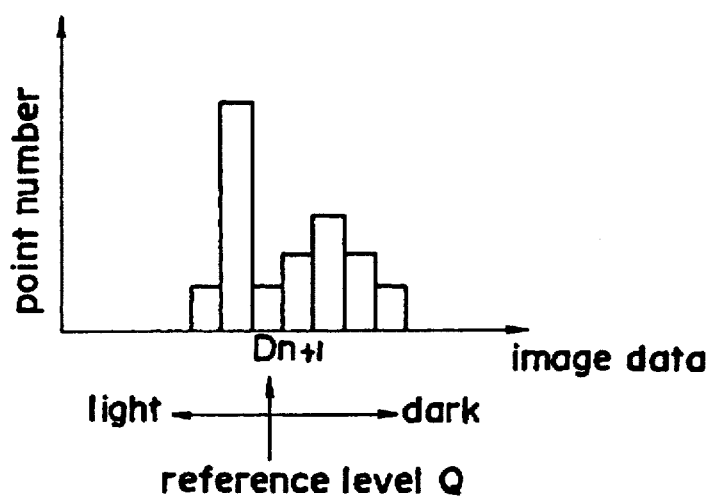

FIG. 1(a) shows changes in the image size when reducing a document and creating a frame on copying paper. FIG. 1(b) shows changes in the image size when enlarging a document provided with a frame and returning it to its original state without the frame;

FIG. 2 is a cross-sectional view of the construction of a digital color copying machine of this embodiment;

FIG. 3 is a front view of the operation panel 1;

FIG. 4 is an outline block diagram of the image area detector;

FIG. 5 shows a document having a square-shaped image area;

FIG. 6(a) is a histogram of image density at sampling points in a portion indicated by the diagonal lines in the document of FIG. 5; FIG. 6(b) is a histogram of image density at sampling points in the entire image of FIG. 5.

Figure 7:
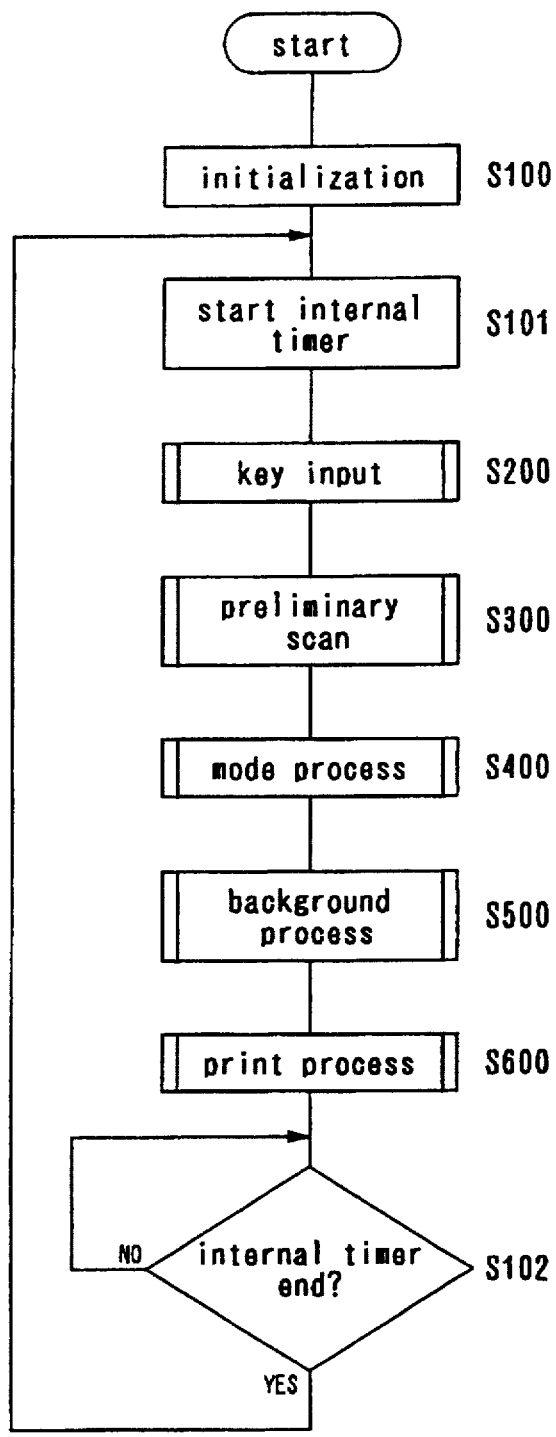
Figure 8:
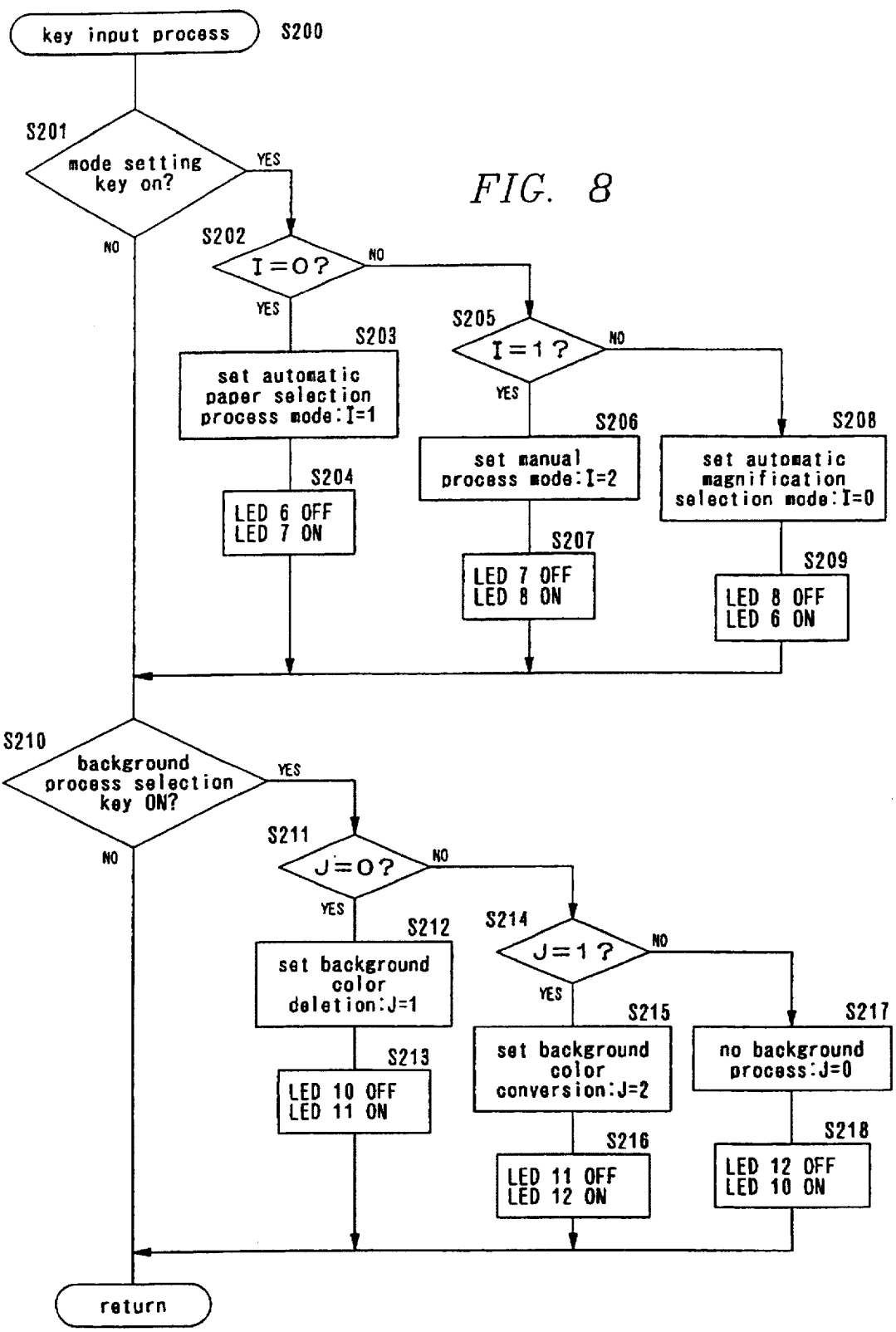
Figure 9:
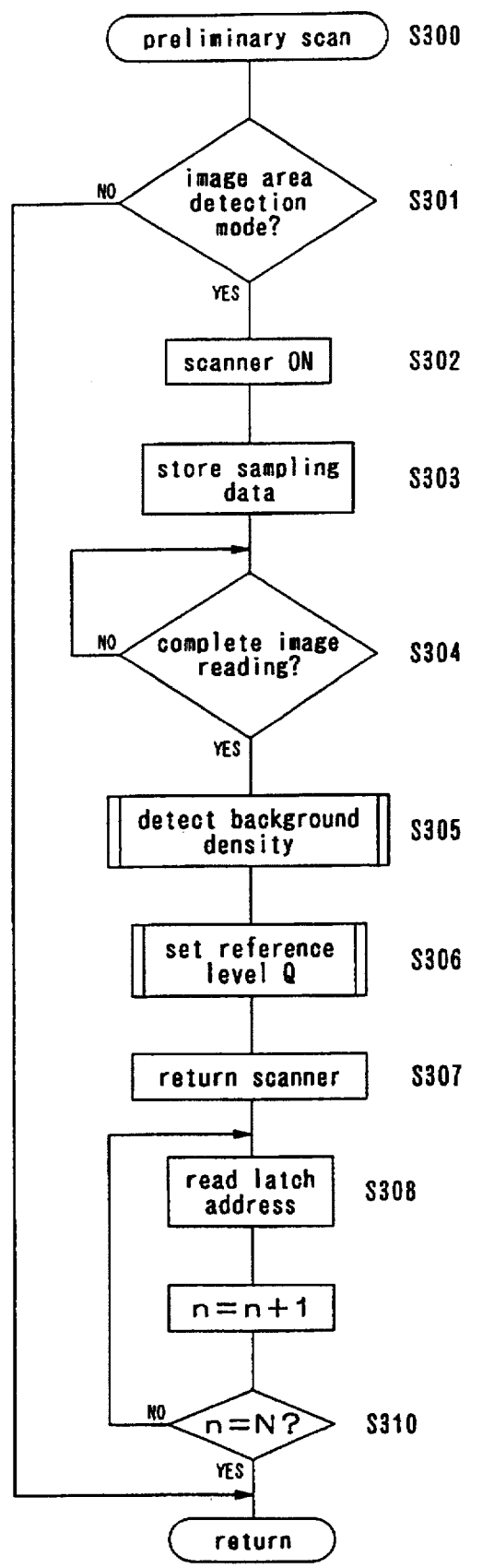
Figure 10:
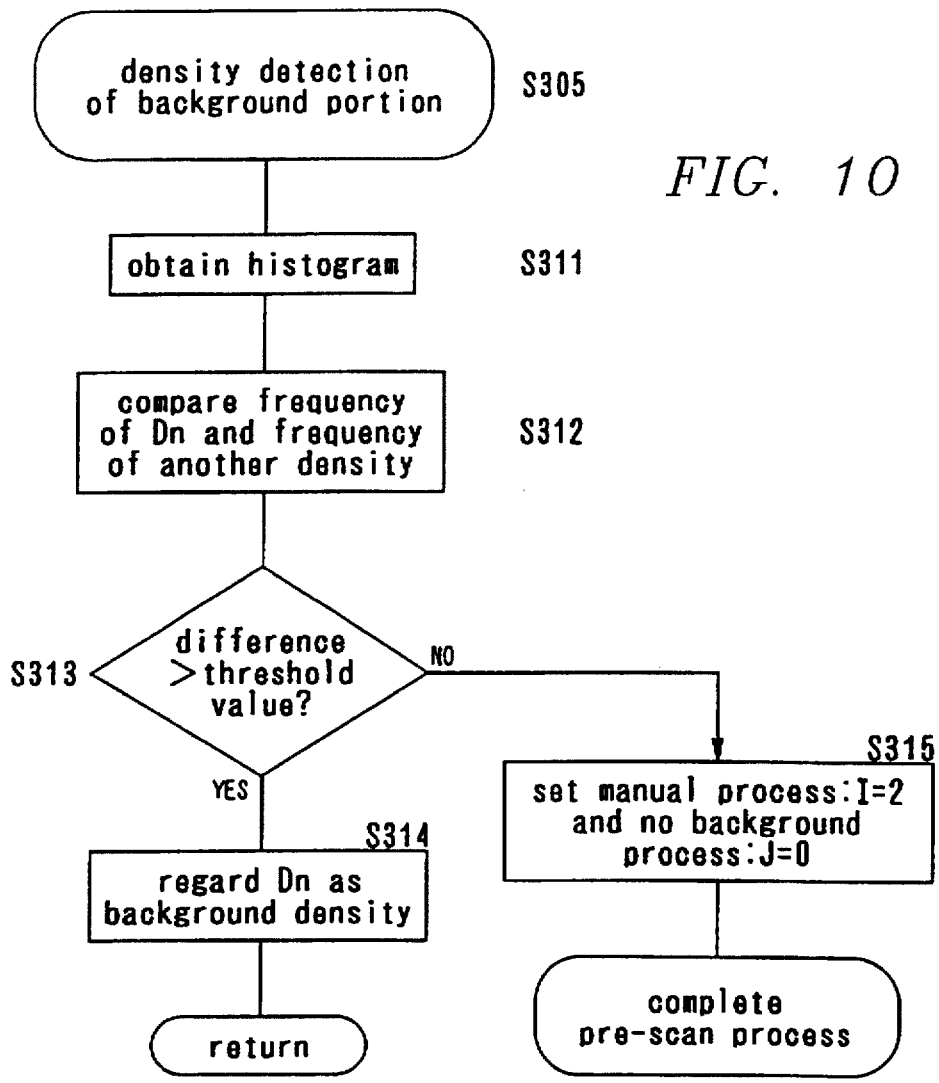
Figure 11:
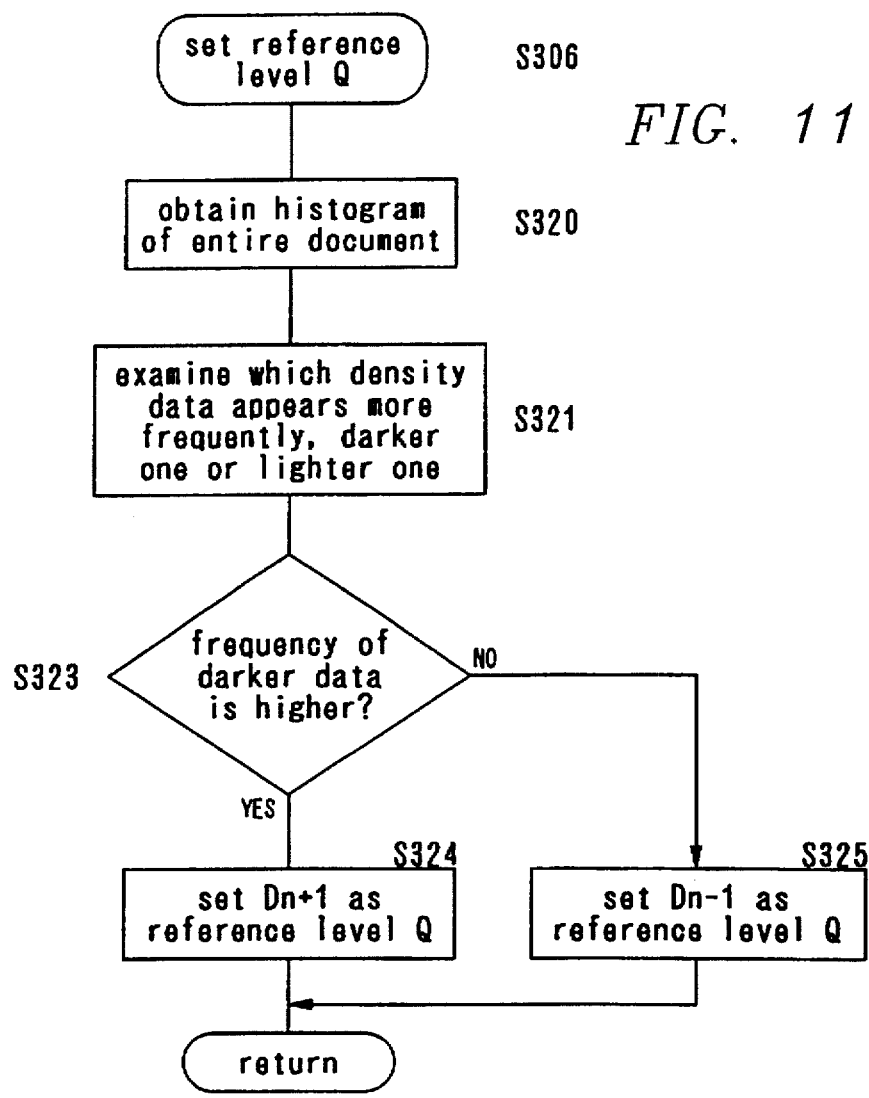
Figure 12:
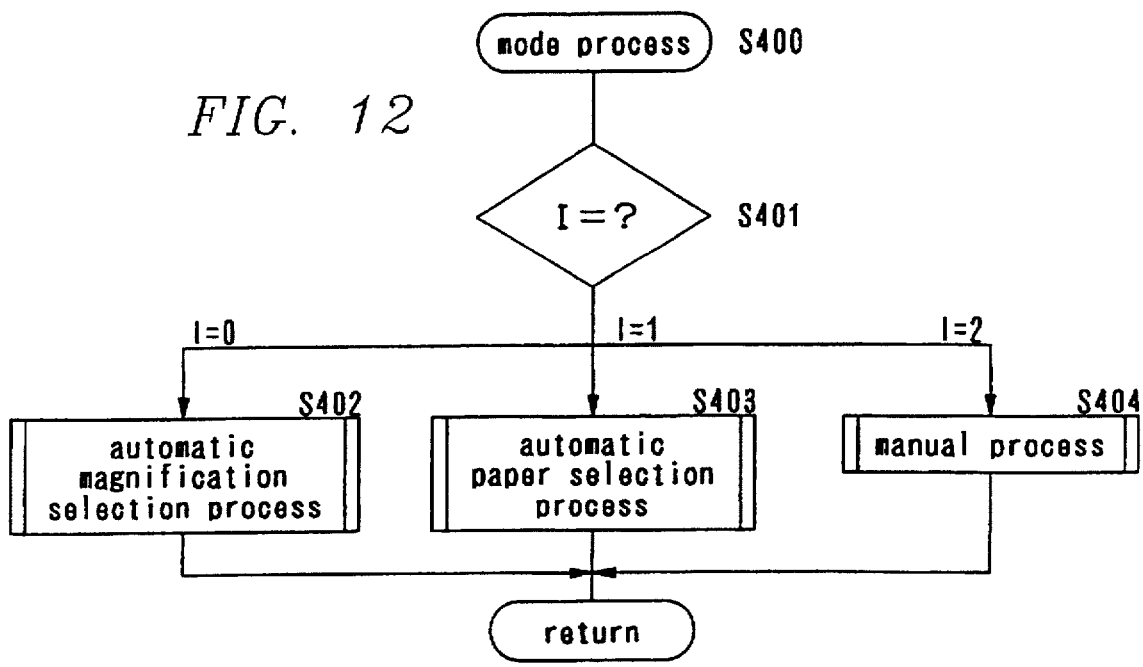
Figure 13:
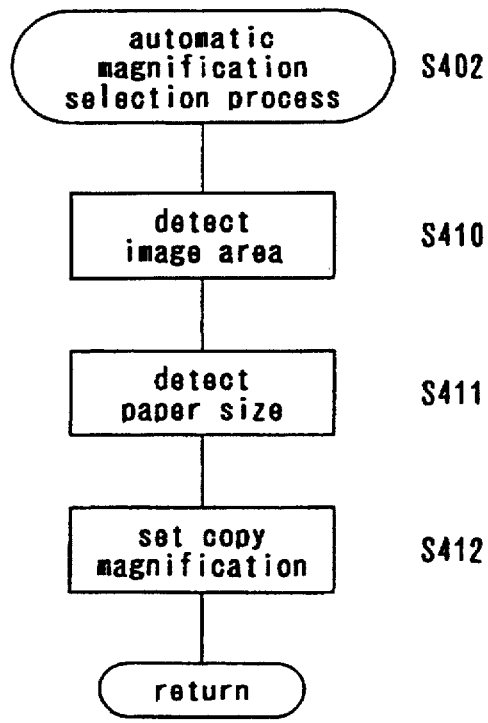
Figure 14:
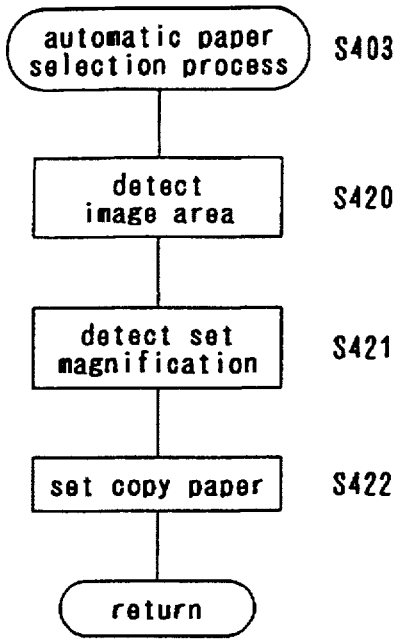
Figure 15:
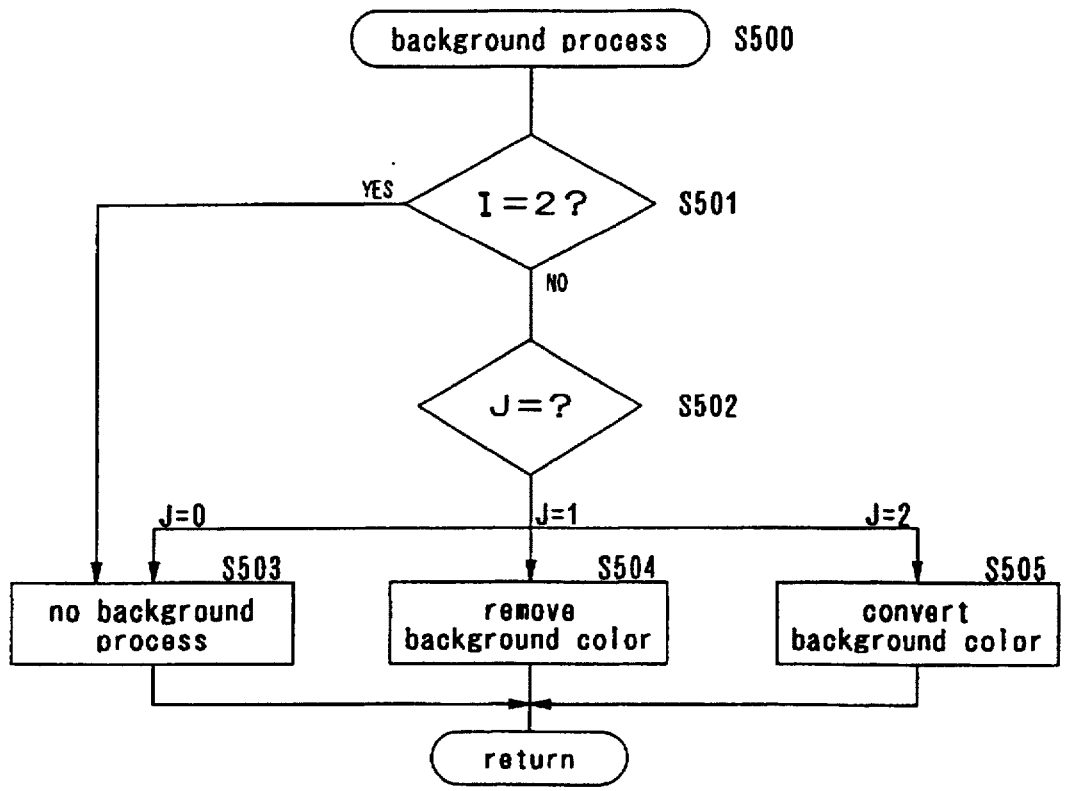

FIG. 7 is a flow chart showing the main routine of the copying operation;

FIG. 8 is a flow chart showing the key input process (step S200);

FIG. 9 is a flow chart showing the preliminary scan process (step S300);

FIG. 10 is a flowchart showing image density detection of the background portion (step S305);

FIG. 11 is a flowchart showing the setting of reference level Q (step S306);

FIG. 12 is a flowchart showing the mode process (step S400);

FIG. 13 is a flowchart showing the automatic magnification selection process (step S402);

FIG. 14 is a flowchart showing the automatic paper selection process (step S403); and FIG. 15 is a flowchart showing the background process (step S500).

DETAILED DESCRIPTION OF THE PREFERRED EMBODIMENTS

Referring now to the drawings, the digital color copying machine of the present invention will be explained.

(1) Construction of digital color copying machine (1-1) Copying machine main body FIG. 2 is a cross-sectional view showing the entire construction of a digital color copying machine of this embodiment. The digital color copying machine is generally divided into an image reader portion 100 that reads document images and copying portion 200 that prints the image read by the image reader portion 100 on copying paper.

The image reader portion 100 is constructed identical to a conventional apparatus. A scanner 10 is provided with an exposure lamp 12 to irradiate the document, a rod lens array 13 to condense light reflected from the document and a CCD sensor 14 to convert the condensed light to an electrical signal. The scanner 10 is driven by a motor 11 while the document is read to move in the direction of the arrow (sub-scanning direction) and scan the document loaded on top of the document glass table 15. The image on the document irradiated by the exposure lamp 12 undergoes photoelectric conversion by the CCD sensor 14. A read signal processor 20 converts the multiple value electrical signal consisting of three colors R, G, B obtained by the CCD sensor 14 into 8-bit gradation data of either yellow (Y), magenta (M), cyan (C) or black (Bk) which is then stored in a buffer memory 30 for synchronous use.

Then, after carrying out gradation corrections (γ correction) in response to the gradation properties of the photoreceptor relative to the gradation data to be input, a print head portion 31 in the copying portion 200 carries out D/A conversion on the corrected image data after the correction, generates a laser drive signal and a semiconductor laser provided in the head portion 31 generates light in response to this drive signal. A photoreceptor drum 41 is evenly charged by an electric charger 43 after being irradiated by an eraser lamp 42 before each copy is exposed. When the photoreceptor drum 41 in a charged state is exposed by laser light, an electrostatic latent image of the document is formed on the surface of the drum. Next, one out of four toner developing assemblies 45a to 45d of four colors cyan (C), magenta (M), yellow (Y) or black (Bk) is selected and develops the electrostatic latent image on the photoreceptor drum 41. Conversely, the copying paper is supplied from a paper cassette 50 and sent to a transfer drum 51 along supply guides. The copying paper is timed during the supply so that the leading edge of the paper is held by a gripper 52 on the transfer drum 51 and is wound around the transfer drum 51. A transfer charger 46 transfers the toner image developed on the surface of the photoreceptor drum 41 to the copying paper wound around the transfer drum 51.

The above printing process is repeated in order of four colors of magenta (M), cyan (C), yellow (Y) and black (Bk). For each color the scanner 10 repeats the scanning operation in synchronization with the operations of the photoreceptor drum 41 and the transfer drum 51. Thereafter, the copying paper is separated from the transfer drum 51 by the operation of a separation claw 47. Toner adhering to the copying paper is fixed to the copying paper by a fixing device 48. After the toner is fixed the copying paper is discharged to a discharge tray 49.

(1-2) Operation panel

FIG. 3 is a front view of the operation panel 1 provided in the main body of the copying machine. On the operation panel 1 provided are a ten-key pad 2 to set the number of copies or copy density, a start key 3 to start the copy operation, a display LED 4 that displays the operation state of the copying machine main body, a mode setting key 5, LEDs 6 to 8 that light when the mode setting key 5 is pressed, a background process selection key 9 and LEDs 10 to 12 that light when the background process selection key 9 is pressed.

The modes set by the mode setting key 5 are the automatic magnification selection process mode, the automatic paper selection process mode and the manual process mode. Each mode is selected in order every time the mode setting key 5 is pressed. When the automatic magnification selection process mode is selected, mode parameter I is set to 0 along with LED 6 lighting. When the automatic paper selection process mode is selected, mode parameter I is set to 1 along with LED 7 lighting. When the manual process mode is selected, mode parameter I is set to 2 along with LED 8 lighting.

The background process set by the background process selection key 9 includes no background process, deletion of background color and conversion of background color. These background processes are achieved by the extraction of the image area of the document. When no background process is selected, background process parameter J is set to 0 along with LED 10 lighting. When deletion of background color is selected, background process parameter J is set to 1 along with LED 11 lighting. When conversion of background color is selected, background process parameter J is set to 2 along with LED 11 lighting.

Said modes and the background processes will be explained later.

(2) Image area detection

According to the copying machine of the present embodiment, when the base color of the document is judged to be a uniform, the density of this base color is considered to be the density of the background portion. The above judgment is done based on the criteria that when the base color is uniform, the frequency of appearance of pixels having the base color density is prominent compared to that of pixels of another density. The detection of the image area is done based on a value of reference level Q determined from the density of the background portion. This value of reference level Q is set based on that, in general, an image darker than the base color is written on a whitish base and an image lighter than the base color is written on a blackish base. Namely, when the frequency of pixels having a color darker than the density of the background portion is high in the entire document, the value of reference level Q is set larger than the density of the background portion by a predetermined value. Further, when the frequency of pixels having a color lighter than the density of the base color is high in the entire document, the value of reference level Q is set smaller than the density of the background portion by a predetermined value. Therefore, when an image is written on a whitish base, a judgment can be made that the image area is a region where the color density of the pixels is larger than the reference level Q. Further, when an image is written on a blackish base, a judgment can be made that the image area is a region where the color density of the pixels is smaller than the reference level Q.

FIG. 4 is an outline block diagram of the image area detector provided in the main body of the copying machine. CPU 300 controls the drive of a motor 11 so that a scanner 10 reads image of the document to generate image data and also processes the data between other processors such as the read signal processor 20. Because the CPU 300 detects the image area of the document before reading the image for the copy process, a preliminary scan is carried out by the scanner 10. The image data of the document obtained when the scanner 10 carries out the preliminary scan of the document is input to the image area detector. As shown with dots in FIG. 5, from among the image data to be input, a data memory 301 stores the data of sampling points provided at predetermined intervals. From the data memory 301 the CPU 300 reads the image data of the sampling points which are in the portion closest to the frame of the document shown by diagonal lines in FIG. 5 to obtain a density histogram. An example density histogram obtained for this case is shown in FIG. 6(a). In this histogram the most frequent value $D_n$ is judged to be the density of the background.

Next, from the data memory 301 the CPU 300 reads the image data of the sampling points of the entire document to obtain a density histogram. An example density histogram obtained in this case is shown in FIG. 6(b). In this histogram, the quantity of data with a higher density is compared to density $D_n$ of the background and the quantity of data with a lower density is compared to density $D_n$ of the background. Reference level Q is set on the side of $D_n$ for which more data present.

FIG. 6(b) illustrates the case where the quantity of data with a color density above $D_n$ exceeds that below $D_n$. Therefore, reference level Q is set to density data $D_{n+1}$. Reference level Q is then used to extract the image area from the document.

To extract the image area the CPU 300 outputs reference level Q obtained by the previous process to a comparator 302. In the comparator 302, a value P of the image data to be input is compared to the value of reference level Q. If the value P of the image data is larger than the value of reference level Q, a high level comparison result signal is output. If P is less than Q, a low level comparison result signal is output. In other words, when the base color is whitish, the density of the image area is darker than the base color. Consequently, the comparison result signal at the location changing from the background portion to the image area rises from a low level to a high level. Similarly, when the base color is blackish, the density of the image area is lighter than the base color. Consequently, the comparison result signal at the location changing from the background portion to the image area falls from a high level to a low level. An address signal of the main scanning direction is input to a latch circuit 303 synchronized with the image data. The latch circuit 303 latches the leading edge address of the image area and sends it to the CUP 300 synchronized with the initial change (rise or fall) of the signal input from the comparator 302, and also latches the trailing edge address of the image area and sends it to the CUP 300 synchronized with the final change (fall or rise) of the signal input from the comparator 300.

The CPU 300 reads the address latched by the latch circuit 303 to verify the position of the image in the main scanning direction. By repeating this process by the number of sampling points provided in the sub-scanning direction, the image area can be detected.

In the image area detecting section the image area be detected but also the document size. This is accomplished in a manner like the image area detection process but where the value of reference level Q is compared to a value based on the color of the document glass table cover. Further, based on the detected image area, regions outside the image area, such as the background portion, can also be removed. After removing regions outside the image area other background colors can also be set. The image area detection process executed by the CPU 300 and processes executed based on data of the detected image area will be described later using flowcharts.

(2-1) Main routine

FIG. 7 is a flowchart showing the main routine of the copying operation executed by the CPU 300. At first, initial settings are made (step S100). These initial settings are initialization of RAM in which data is temporarily stored while the CPU 300 operates, as well as setting each function and clearing each timer counter. Next, the internal timer is cleared and started (step S101). After the internal timer starts, input of the mode selection key 5 and background process selection key 9 or, input of copying paper size, copying magnification or number of copies, all by the user, is requested (step S200). After the key input, preliminary scan process (step S300) starts. After the preliminary scan process, mode process routine (step S400), background process routine (step S500) and print process (step S600) are executed. The above process waits until the internal timer completes (YES in step S102) and then returns to step S101 to repeat.

(2-2) Key input process

FIG. 8 is a flowchart showing the key input process (step S200). When the user presses the mode setting key 5 (YES in step S201), the value of mode parameter I is examined. When the automatic magnification selection process mode (I=0) is set (YES in step S202), the automatic paper selection process mode (I=1) is set (step S203), and LED 6 is turned off and LED 7 is turned on (step S204). Further, when the automatic paper selection process mode (I=1) is set (YES in step S205), the manual process mode (I=2) is also set (step S206), and LED 7 is turned off and LED 8 is turned on (step S207). Still further, when the manual process mode (I=2) is set (NO in step S205), the automatic magnification selection process mode (I=0) is set (step S208), and LED 8 is turned off and LED 6 is turned on (step S209). When the user does not press the mode setting key 5 (NO in step S201), the mode which is already set is executed.

Moreover, when the user presses the background process selection key 9 (YES in step S210), the value of background process parameter J is examined. When no background process (J=0) is set (YES in step S211), deletion of background color (J=1) is set (step S212), and LED 10 is turned off and LED 11 is turned on (step S213). When deletion of background color (J=1) is set (YES in step S214), conversion of background color (J=2) is set (step S215), and LED 11 is turned off and LED 12 is turned on (step S216). When conversion of background color (J=2) is set (NO in step S214), no background process (J=0) is set (step S217), and LED 12 is turned off and LED 10 is turned on (step S218). When the user does not press the background process selection key 9 (NO in step S210), the background process mode which is already set is executed.

After inputting copy paper size, copy magnification and number of copies as well as other input processes the key insert process returns.

(2-3) Preliminary scan process

FIG. 9 is a flowchart showing the preliminary scan process (step S300). At first, a judgment is made on whether or not an image area detection mode is set (step S301). The image area detection mode means the automatic magnification selection process mode and the automatic paper selection process mode described in the above key input process (step S200). When the image area detection mode is set (YES in step S301), the motor 11 drives to move the scanner 10 in the sub-scanning direction (step S302). As shown by the dots in FIG. 5, image data of sampling points provided at predetermined intervals in the main scanning direction and sub-scanning direction is stored in data memory 301 (step S303). Waiting until the read of one screen of image data completes (YES in step S304), image data of the sampling points at the frame portion of the document indicated by the diagonal lines in FIG. 5 is read from the data memory 301 to obtain a density. When the base color is judged to be uniform based on the density histogram, the most frequent value $D_n$ is set as the density data of the background portion (step 305, refer to FIG. 6(a)). The density detection process of this background portion will be described later. Next, the data of the sampling points of the entire document is read, thereby a density histogram is obtained to determine reference level Q based on the density data level of the background portion determined in step S305 (step S306). The setting of this reference level Q will be described later.

The motor 11 is driven in reverse to return the scanner 10 (step S307). During this time the CPU 300 reads the leading edge and trailing edge addresses of the document area latched by the latch circuit 303 (step S308). When the number of sampling points provided in the sub-scanning direction is N, the process in step S308 described above is repeated N times (step S310), thereby the image area is detected. The process waits for the completion of the process of N sampling points provided in the sub-scanning direction (YES in step S310) to return.

(2-3-1) Density detection of background portion

According to the copying machine of this embodiment, when the base color of the document is judged to be uniform, the density of this base color is the density of the background portion. The above judgment is executed based on the fact that the frequency of appearance of pixels having the base color is prominent comparing the frequency of appearance of pixels having another density when the base color is uniform.

FIG. 10 is a flowchart of the density detection process of the background portion (step S305). First, image data in the sampling points at the frame portion of the document indicated by the diagonal lines in FIG. 5 is read from the data memory 301 to obtain a density histogram (step S311). The frequency of the most frequent value $D_n$ of the obtained histogram is compared to the frequency of another density (step S312). If the base color of the document is uniform, a histogram as shown in FIG. 6(a) for example, can be obtained. However, when the document is a photograph and the base color is not uniform, there is not an extreme difference between the frequency of the most frequent value of the density histogram and the frequency of another density. Thereupon, when the difference between the frequency of the most frequent value $D_n$ of the obtained histogram and the frequency of another density is larger than the threshold value determined by experiment (YES in step S313), the base color of the document is judged to be uniform and the most frequent value $D_n$ is regarded as the density of the background portion (step S314) and the process returns. Conversely, when the above difference is smaller than the threshold value (NO in step S313), detection of the image area is judged to be impossible, then the manual process mode (I=2) and the no background process (J=0) are set, and the preliminary scan process itself is completed (step S315).

(2-3-2) Setting of reference level Q

The detection of the image area is done based on the value of reference level Q determined from the density of the background portion. The above value of reference level Q is set in consideration that an image darker than the base color is written for a whitish base and an image lighter than the base color is written for a blackish base. In other words, when pixels darker than the density of the background portion appear frequently in the entire document, the reference level Q is set to a value larger than the density of the background portion by a predetermined value. Similarly, when pixels with a color lighter than the density of the base color appear frequently in the entire document, the reference level Q is set to a value smaller than the density of the background portion by a predetermined value. The reason why the density of the background portion is not directly set as the reference level Q is that a certain latitude is preferably allowed to a density of pixels regarded as the background. With such a procedure, reliability for detecting the image area is improved.

FIG. 11 is a flowchart showing the setting of reference level Q executed during the above-described preliminary scan (step S306). First, the sampled image data from the entire document is used to obtain the density histogram as shown in FIG. 6(b) (step S320). Next, the data is examined to determine whether ligt or dark density data appears more frequently in comparison with the background density $D_n$ (step S321). Here, if the frequency of darker data ($D_{n+1}$, $D_{n+2}$, etc.) is higher than density data $D_n$ of the background (YES in step S323), the document is judged to be written an image on a whitish base. Therefore, to extract the image area from the document, density data $D_{n+1}$ darker than the data $D_n$ by a predetermined value (for example 5 for data with 256 gradations) is set to reference level Q (step S324). On the other hand, if the frequency of lighter data ($D_{n-1}$, $D_{n-2}$, etc.) higher than density data $D_n$ of the background (NO in step S323), this document is judged to have a bright image written on a blackish base. Therefore, to extract the image area from the document, density data $D_{n-1}$ lighter than the said data $D_n$ by a predetermined value (for example 5 for data with 256 gradations) is set to reference level Q (step S325).

(2-4) Mode process

FIG. 12 is a flowchart showing the mode process (step S400). First the value of mode parameter I set by the key input process (step S200) is examined (step S401). When I=0, the automatic magnification selection process is executed (step S402). In the automatic magnification selection process, an image area is enlarged or reduced to the size of the copying paper selected by the user based on the detection of the image area within the document and the largest width (L1 and L2 of FIG. 5) in the main scanning direction and vertical scanning direction of the detected image area (refer to FIG. 1(b)). When I=1, the automatic paper selection process is executed (step S403). In the automatic paper selection process, an appropriate size of the copying paper is selected based on the detection of the image area within the document and the largest width (L1 and L2 of FIG. 5) in the main scanning direction and sub-scanning direction of the detected image area as well as the copying magnification set by the user. When I=2, the image area is not detected and the normal manual process is executed (step S404).

(2-4-1) Automatic magnification selection process

FIG. 13 is a flowchart of the automatic magnification selection process. First, the image area is detected (step S410). Next, the size of the copying paper selected by the user is detected (step S411). Then, the largest width (L1 and L2 of FIG. 5) is obtained in the main scanning direction and sub-scanning direction of the image area detected in the above-said step S410, and the copying magnification to enlarge or reduce the image area to the size of the copying paper selected by the user is set (step S412) based on the obtained largest width. Hereupon, as shown in FIG. 5, the largest width L1 in the main scanning direction of the image area is the difference between the smallest leading edge address and largest trailing edge address. Moreover, as shown in FIG. 5, the largest width L2 in the sub-scanning direction is the width from the initially detected position of the image area to the finally detected position of the image area. Since the copying magnification is set, for example, a smaller magnification is adopted between the magnification for which the image area would be fully enlarged in the main scanning direction of the copying paper and the magnification for which the image area would be fully enlarged in the sub-scanning direction. This prevent loss of a portion of the image area. By carrying out the copying process with the copying magnification set by the process described above, the image area within the document can to be enlarged to the full extent the copy paper as shown in FIG. 1(b), thereby it becomes unnecessary to make wasteful test copies when enlarging or reducing the image area.

(2-4-2) Automatic paper selection process

FIG. 14 is a flowchart of the automatic paper selection process (step S403). At first, the image area is detected (step S420). Next, the value of the copying magnification set by the key input process (step S200) is detected (step S421). The largest widths (L1 and L2 of FIG. 5) is obtained in the main scanning direction and sub-scanning direction of the image area detected in the above-mentioned step S420. And then the smallest size copy paper is selected among any size of paper which is able to completely contain the image area obtained by multiplying the largest width (L1 and L2) and the copying magnification together (step S422). This allows selection of an appropriate size of copying paper in copying the image area at a desired magnification, and prevents copying paper from being wasted.

(2-5) Background process

In the copying machine of this embodiment, since the image area can be accurately detected in either step S410 or step S420 of said mode process (step S400), the process below can be carried out for regions outside the image area such as the background portion.

FIG. 15 is a flowchart of the background process (step S500). First, whether or not the mode to detect the image area has been set by the user is examined. When the manual process mode has been set by the user (YES in step S501), the special process for the background is not executed (step S502). On the other hand, when either the automatic magnification selection mode (I=0) or automatic paper selection process mode (I=1) has been set by the user (NO in step S501), the value of background process parameter J that has been set is examined (step S502). When J=0, the special process for the background is not executed (step S503). When J=1, the color of the background is removed (step S504). The removal of the background color here means to set the value of the density data of the region outside the image area detected in either step S410 or step S420 of said mode process (step S400) to a default value. The default value of the background color is set in the copying machine beforehand (for example white). When J=2, the background color is converted to another color (step S505). The color conversion is carried out by converting the density data of the region outside the image area detected in either step S410 or step S420 of said mode process (step S400) to a color set by the user.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
   reading means for reading a document image which includes an image area and a background, and converting the read document image to a digital image data of multiple value having a most frequently occurring image data value and a distribution of image data values;
   detecting means for detecting a density of the background in the image based on the image data obtained by said reading means;
   setting means for setting a reference value as a multiple value data based on the background density obtained by said detecting means as well as by the distribution of the image data values; and
   distinction means for distinguishing the image area from the background by comparing the reference value set by said setting means and the image data detected by said reading means;
   wherein said detecting means sets the background density by determining the most frequently occurring image data value in the image data for the whole document; and
   wherein said setting means compares in the distribution the number of image data values less the background density and the number of image data values greater than the background density, and sets the reference value in relation to the background density based on the result obtained by said comparison.

2. The image forming apparatus as claimed in claim 1, wherein said distinction means distinguishes the image area by latching points at which comparison result between the reference value and the image data is reversed.

3. The image forming apparatus as claimed in claim 1, wherein said setting means sets the reference level by the image data obtained by said reading means as well as by the background density.

4. The image forming apparatus as claimed in claim 1, wherein said image forming apparatus is a digital color copying apparatus.

5. An image forming apparatus comprising:
   reading means for reading a document image which includes an image area and a background, and converting the read document image to a digital image data of multiple value;
   detecting means for detecting a density of the background in the image based on the image data obtained by said reading means;
   setting means for setting a reference value as a multiple value data based on the background density obtained by said detecting means:
   distinction means for distinguishing the image area from the background by comparing the reference value set by said setting means and the image data detected by said reading means:
   processing means for executing a predetermined process concerning with the image area distinguished by said distinction means;
   judging means for judging whether or not distinction of the image area is able to be executed based on the data obtained by said reading means; and
   control means for controlling execution of the predetermined process in accordance with the judgement of said judging means.

6. An image forming apparatus comprising:
   reading means for reading a document image which includes an image area and a background, and converting the read document to a digital image data of multiple value;
   distinction means for distinguishing the image area from the background;
   judging means for judging whether or not distinction of the image area is able to be executed based on the data obtained by said reading means; and
   processing means for executing an automatic paper selection process based on the image area distinguished by said distinction means in a case where a judgment by said judging means is affirmative.

7. An image forming apparatus comprising:
   reading means for reading a document image which includes an image area and a background, and converting the read document to a digital image data of multiple value;
   distinction means for distinguishing the image area from the background;
   judging means for judging whether or not distinction of the image area is able to be executed based on the data obtained by said reading means; and
   processing means for executing an automatic magnification selection process based on the image area distinguished by said distinction means in a case where a judgment by said judging means is affirmative.

8. An image forming apparatus comprising:

reading means for reading a document image which includes an image area and a background, and converting the read document image to a digital image data of multiple value;

detecting means for detecting a density of the background of the document based on the image data obtained by said reading means;

judging means for judging whether or not the detection of background density is able to be executed based on the data obtained by said reading means;

processing means for executing a predetermined process; and control means for controlling execution of said processing means in accordance with the judgement of said judging means.

9. The image forming apparatus as claimed in claim 8, wherein said judging means detects the uniformity of background density to judge the possibility of detection of the background density.

10. The image forming apparatus as claimed in claim 8, further comprising:

setting means for setting a mode to execute said predetermined process; and means for prohibiting said processing means to execute said predetermined process set by said setting means, when said judging means judges that the detection of background density is unable to be executed.

11. The image forming apparatus as claimed in claim 10 further comprising distinction means for distinguishing the image area from the background based on the background density as well as the image data obtained by said reading means.

12. The image forming apparatus as claimed in claim 10, wherein said predetermined process is an automatic magnification selection process.

13. The image forming apparatus as claimed in claim 10, wherein said predetermined process is an automatic paper selection process.

14. The image forming apparatus as claimed in claim 10, wherein said predetermined process is deletion of background color.

15. The image forming apparatus as claimed in claim 10, wherein said predetermined process is change of background color.

16. An image forming apparatus comprising:

reading means for reading a document image which includes an image area and a background, and converting the read document image to a digital image data of multiple value;

distinction means for distinguishing the image area of the document from the background;

judging means for judging whether or not the distinction of the image area is able to be executed;

processing means for executing a predetermined process concerning the image area distinguished by said distinction means; and control means for controlling execution of said processing means in accordance with the judgement of said judging means.

17. The image forming apparatus as claimed in claim 16, wherein said predetermined process is an automatic magnification selection process.

18. The image forming apparatus as claimed in claim 16, wherein said predetermined process is an automatic paper selection process.

19. The image forming apparatus as claimed in claim 16, wherein said predetermined process is deletion of background color.

20. The image forming apparatus as claimed in claim 16, wherein said predetermined process is change of background color.

21. A method for distinguishing an image area of a document from a background in a image forming apparatus comprising the following steps of:

first step for reading a whole document image which includes an image area and a background, and converting the read document image to a digital image data of multiple value;

second step for detecting a density of the background based on the image data;

third step for setting a reference value as a multiple value data based on the detected background density as well as a distribution of the image data;

fourth step for comparing the set reference value and the image data;

fifth step for determining the image area based on a result of the comparison of said fourth step;

sixth step for executing a predetermined process concerning the image area determined by said fifth step;

seventh step for judging whether or not determination of the image area is able to be executed based on the data obtained by said first step; and eighth step for controlling execution of the predetermined process in accordance with the judgement of said seventh step.

22. An image forming method comprising the steps of:

reading a document image which includes an image area and a background, and converting the read document to a digital image data of multiple value;

distinguishing the image area from the background;

judging whether or not distinction of the image area is able to be executed based on the data obtained by reading said document; and executing an automatic paper selection process based on the image area distinguished in a case where a judgment by said judging is affirmative.

23. An image forming method comprising the steps of:

reading a document image which includes an image area and a background, and converting the read document to a digital image data of multiple value;

distinguishing the image area from the background;

judging whether or not distinction of the image area is able to be executed based on the data obtained by reading said document; and executing an automatic magnification selection process based on the image area distinguished in a case where a judgment by said judging is affirmative.

24. An image forming method comprising the steps of:

reading a document image which includes an image area and a background, and converting the read document image to a digital image data of multiple value;

detecting a density of the background of the document based on the image data obtained by said reading;

judging whether or not the detection of background density is able to be executed based on the data obtained by said reading;

executing a predetermined process; and controlling execution of said process in accordance with the judgement.

25. An image forming method comprising the steps of:

reading a document image which includes an image area and a background, and converting the read document image to a digital image data of multiple value;

distinguishing the image area of the document from the background;

judging whether or not the distinction of the image area is able to be executed;

executing a predetermined process concerning the image area distinguished; and controlling execution of said process in accordance with the judgement.

\* \* \* \* \*

UNITED STATES PATENT AND TRADEMARK OFFICE
CERTIFICATE OF CORRECTION

PATENT NO. : 5,761,338
DATED : June 2, 1998
INVENTOR(S) : Toru KASAMATSU

It is certified that error appears in the above-identified patent and that said Letters Patent is hereby corrected as shown below:

Column 10, claim 5, line 26, delete "means:" and insert --means;--.

Column 10, claim 5, line 30, delete "means:" and insert --means;--.

Signed and Sealed this

Twenty-second Day of September, 1998

Attest:

BRUCE LEHMAN

Attesting Officer      Commissioner of Patents and Trademarks